(12) United States Patent
Graf et al.

(10) Patent No.: US 7,738,137 B2
(45) Date of Patent: Jun. 15, 2010

(54) INKJET PRINT HEAD SYNCHRONOUS SERIAL OUTPUT FOR DATA INTEGRITY

(75) Inventors: Paul W. Graf, Lexington, KY (US); Kristi M. Rowe, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 1112 days.

(21) Appl. No.: 10/806,910

(22) Filed: Mar. 23, 2004

(65) Prior Publication Data

US 2005/0212831 A1 Sep. 29, 2005

(51) Int. Cl.
*G06F 15/00* (2006.01)
*G06K 1/00* (2006.01)
*G06K 15/00* (2006.01)
*G06F 3/12* (2006.01)

(52) U.S. Cl. .................................... 358/1.8; 358/1.15
(58) Field of Classification Search ................ 358/1.14, 358/1.15, 731, 700, 798, 1.1, 1.8, 1.13
See application file for complete search history.

(56) References Cited

U.S. PATENT DOCUMENTS

| | | | |
|---|---|---|---|
| 3,975,712 A * | 8/1976 | Hepworth et al. ........... 714/800 |
| 5,808,631 A | 9/1998 | Silverbrook | |
| 5,835,817 A * | 11/1998 | Bullock et al. ................ 399/25 |
| 5,838,339 A | 11/1998 | Silverbrook | |
| 6,065,824 A * | 5/2000 | Bullock et al. ................ 347/19 |
| 6,161,916 A * | 12/2000 | Gibson et al. ................. 347/19 |
| 6,315,387 B1 | 11/2001 | Horikoshi | |
| 6,419,341 B1 | 7/2002 | Nohata et al. | |
| 6,467,867 B1 | 10/2002 | Worthington et al. | |
| 6,476,928 B1 * | 11/2002 | Barbour et al. ............ 358/1.15 |
| 6,547,364 B2 | 4/2003 | Silverbrook | |
| 6,565,181 B2 | 5/2003 | Silverbrook | |
| 6,565,198 B2 * | 5/2003 | Saruta et al. .................... 347/86 |
| 6,616,260 B2 * | 9/2003 | Skene et al. ..................... 347/19 |
| 6,644,770 B1 * | 11/2003 | Niimura et al. ................ 347/14 |
| 6,718,491 B1 * | 4/2004 | Walker et al. ................ 714/701 |
| 6,943,911 B1 * | 9/2005 | Ono et al. .................... 358/1.16 |
| 7,165,824 B2 * | 1/2007 | Walmsley et al. ............. 347/19 |
| 2001/0015818 A1 * | 8/2001 | Kawanabe et al. ......... 358/1.15 |
| 2001/0017703 A1 | 8/2001 | Szumla | |
| 2003/0095158 A1 * | 5/2003 | Akitaya et al. ................ 347/14 |
| 2003/0146951 A1 | 8/2003 | Skene et al. | |
| 2004/0246503 A1 * | 12/2004 | Silverbrook ................ 358/1.1 |
| 2006/0082609 A1 * | 4/2006 | Walmsley et al. ............. 347/14 |

* cited by examiner

*Primary Examiner*—Douglas Q Tran

(57) ABSTRACT

A method of error detection in an inkjet printing apparatus having a host coupled to a print head. The method comprises the acts of communicating a first data stream between the host and the print head, inserting a reference data stream into the first data stream, and validating the first data stream based on the reference data stream.

23 Claims, 2 Drawing Sheets

FIG. 2
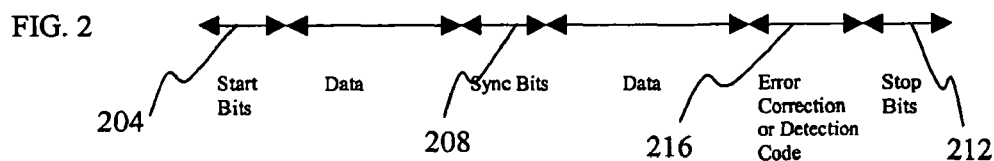
FIG. 3
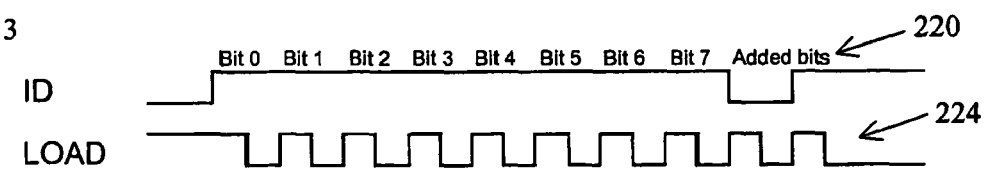
FIG. 4
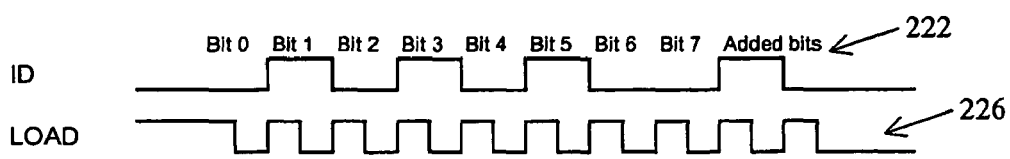
FIG. 5
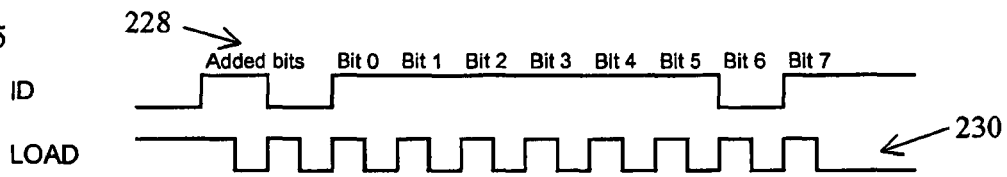
FIG. 6
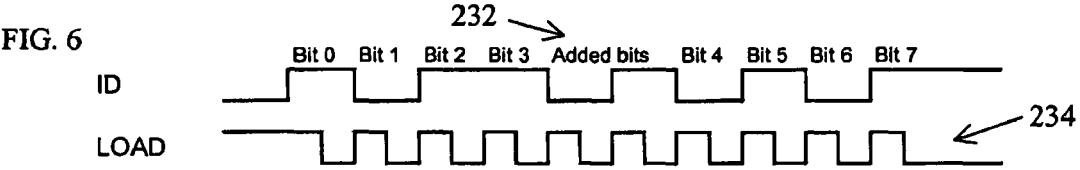
FIG. 7
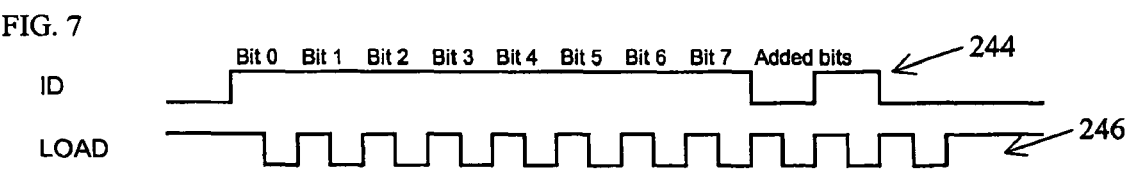

INKJET PRINT HEAD SYNCHRONOUS SERIAL OUTPUT FOR DATA INTEGRITY

BACKGROUND OF THE INVENTION

The invention relates to inkjet printing apparatus, and particularly to communication between an inkjet print head and a print controller.

An inkjet printing apparatus such as inkjet printer, all-in-one device, multifunction device, typically uses a print controller or a printer host to control and to communicate with an inkjet print head. A thermal inkjet print head generally has a heater chip. The heater chip typically includes logic circuitry, a plurality of power transistors, and a set of heaters or resistors. A hardware or software printer driver will selectively address or energize the logic circuitry such that appropriate resistors are heated for printing. In some heater chip designs, the heater chip includes memory used to store information about the print head. Data stored in the memory is used to identify the print head to determine if the print head is a monochrome print head, a color print head or a photograph quality print head. Data stored in the memory is used to keep track of ink usage.

To communicate data from the print head to the printer, the printer issues a command to the print head. The print head then responds by sending data via electronic digital communication to the printer in order to complete the command. For example, the printer may store ink usage information in memory to read upon print head power up. Upon print head power up, the printer issues a memory read command of the print head ink usage memory. The print head receives and decodes the command, reads the print head memory and responds to the printer with the data. Errors may occur during the electronic digital communication between the print head and printer. For example, a print head may lose mechanical and thus electrical contact during a memory read operation of ink usage. The loss of mechanical contact corrupts the print head memory read operation. The printer may thus interpret the corrupt data as an incorrect level of ink usage, prompting an incorrect indication to the user of the ink level that causes the user to think that the print head has failed to meet the print head's page yield specification.

SUMMARY OF THE INVENTION

Accordingly, there is a need for improved data communication between the print head and the printer. In one form, the invention provides a method of error detection in an inkjet printer that has a printer host coupled to a print head. The method includes the acts of communicating a first data stream between the printer host and the print head, inserting a reference data stream into the first data stream, and validating the first data stream based on the reference data stream.

In another form, the invention provides a method of error detection in an inkjet printer that has a printer host coupled to a print head. The method includes the acts of synchronously receiving a data stream at the printer host from the print head, searching for a validating data stream from the received data stream, and validating the received data stream when the validating data stream comprises a valid data stream pattern.

In yet another form, the invention provides a data error detection system on an inkjet print head coupled to a printer host. The data error detection system includes a print head communicator that couples the print head and the printer host, and communicates a first data stream between the print head and the printer host. The system further includes a data stream processor (as shown in FIG. 8) that is coupled to the print head, and inserts a reference data stream into the first data stream, and a data validating module (as shown in FIG. 8) coupled to the printer host, and validates the first data stream based on the reference data stream.

In still another form, the invention provides an inkjet print head adapted for use in printer having a printer host. The inkjet print head includes a transmitter to synchronously transmit a data stream, and a controller coupled to the printer host, searches for a validating data stream from the transmitted data stream, and validates the received data stream when the validating data stream comprises a valid data stream pattern.

Other features and advantages of the invention will become apparent to those skilled in the art upon review of the following detailed description, claims, and drawings.

BRIEF DESCRIPTION OF THE DRAWINGS

In the drawings:

FIG. 2 illustrates a first exemplary data sequence according to one embodiment of the invention showing a data stream incorporating start bits, sync bits, error correction or error detection bits and stop bits;

FIG. 3 illustrates a second exemplary data sequence according to one embodiment of the invention utilizing a '01' stop bit pattern;

FIG. 4 illustrates a third exemplary data sequence according to one embodiment of the invention utilizing a '10' stop bit pattern;

FIG. 5 illustrates a fourth exemplary data sequence according to one embodiment of the invention utilizing a '10' start bit pattern;

FIG. 6 illustrates a fifth exemplary data sequence according to one embodiment of the invention utilizing a '01' sync bit pattern;

FIG. 7 illustrates an eighth exemplary data sequence according to one embodiment of the invention utilizing a '010' stop bit pattern.

FIG. 8 illustrates an inkjet print head coupled to a Data Stream Processor and a print controller coupled to a Data Validating Module.

DETAILED DESCRIPTION

Figure 1:
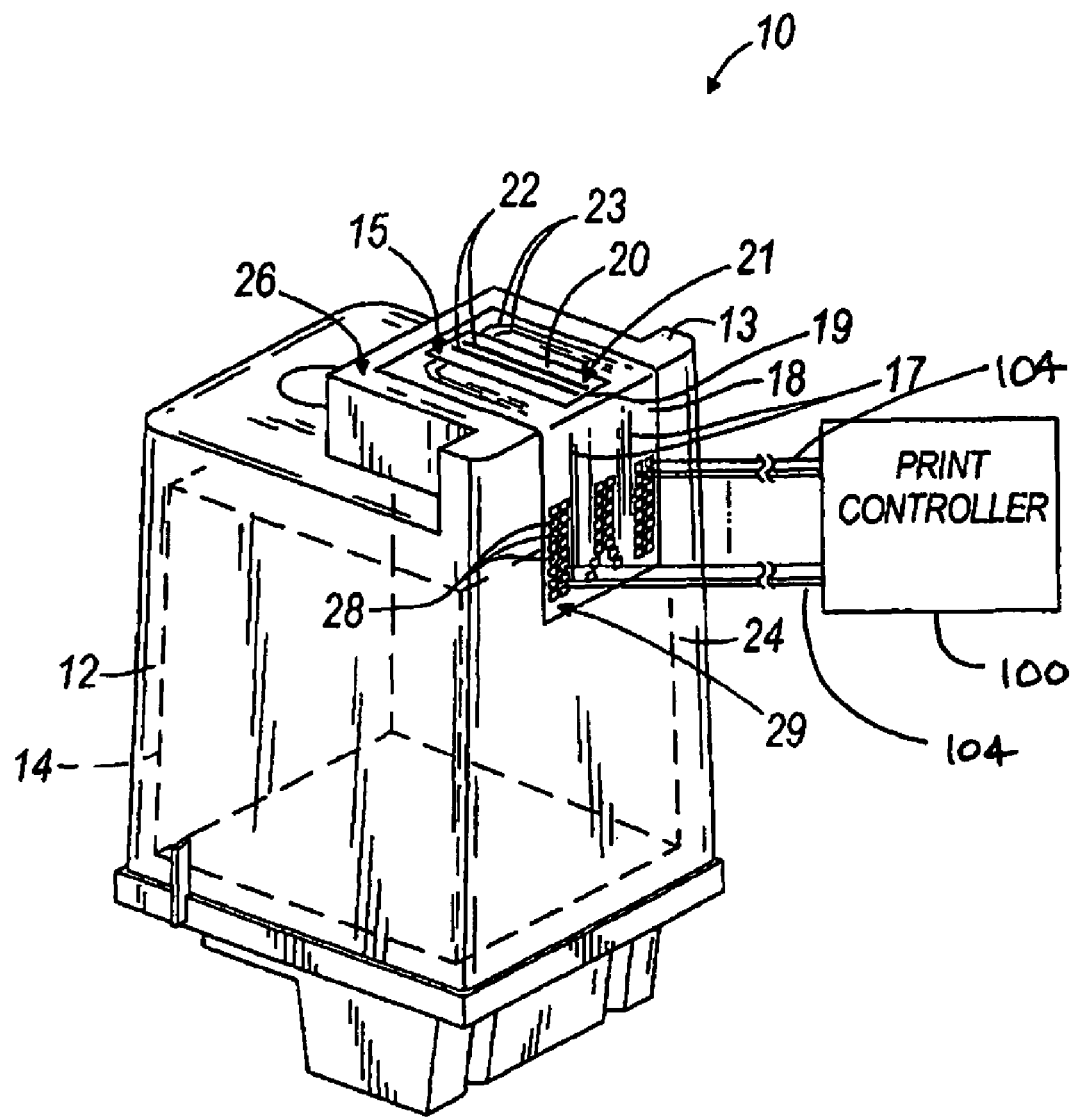
FIG. 1 illustrates an inkjet print head according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

FIG. 1 illustrates an inkjet print head 10 according to one embodiment of the invention. The print head 10 includes a housing 12 that defines a nosepiece 13 and an ink reservoir 14 containing ink or a foam insert saturated with ink. The housing 12 can be constructed of a variety of materials including, without limitation, one or a combination of polymers, metals, ceramics, composites, and the like. The inkjet print head 10 illustrated in FIG. 1 has been inverted to illustrate a nozzle portion 15 of the print head 10. The nozzle portion 15 is located at least partially on a bottom surface 26 of the nosepiece 13 for transferring ink from the ink reservoir 14 onto a print medium (not shown). The nozzle portion 15 can include a heater chip (not visible in FIG. 1) and a nozzle plate 20 having a plurality of nozzles 22 that define a nozzle arrangement and from which ink drops are ejected onto printing medium that is advanced through a printer (not shown) The nozzles 22 can have any cross-sectional shape desired including, without limitation, circular, elliptical, square, rectangular, and any other polygonal shape that allows ink to be transferred from the print head 10 to a printing medium. The heater chip can be formed of a variety of materials including, without limitation, various forms of doped or non-doped silicon, doped or non-doped germanium, or any other semiconducting material. The heater chip is positioned to be in electrical communication with conductive traces 17 provided on an underside of a tape member 18.

The heater chip is hidden from view in the assembled print head 10 illustrated in FIG. 1. The heater chip is also attached to the nozzle plate 20 in a removed area or cutout portion 19 of the tape member 18. The heater chip is attached such that an outwardly facing surface 21 of the nozzle plate 20 is generally flush with and parallel to an outer surface 29 of the tape member 18 for directing ink onto a printing medium via the plurality of nozzles 22 in fluid communication with the ink reservoir 14. Although thermal inkjet printing apparatus is used in the example, other types of inkjet technology such as piezoelectric technology can also be used with the invention.

To control the print head, a printer host or a print controller 100 issues or transmits a command through a plurality of communication paths 104. The print head thereafter preferably receives the command through the paths 104, and transmits a response back to the print controller 100 via the paths 104. However, factors such electromagnetic interference between components, and simple mechanical malfunctioning of the paths can cause errors in the data transmitted or received.

In general, print head to printer communication errors fall into two categories: link errors and framing errors. A link error arises from an interruption of the communication path 104 during a command transmission or a response reception. The link error thus results in an interpretation error of the command or the response. Events that can cause a link error include a loss of electrical contact to the communication paths during a command/response sequence or an inadvertent power on reset of either the print head or printer during the command/response sequence. A framing error arises from missing data or extra data in the stream of data either in the command or the response. A framing error also can corrupt either the interpretation of the command or the interpretation of the response. Events that can cause a framing error include electromagnetic interference or a mechanical resonance that causes intermittent contact during the command/response sequence.

As described earlier, heater chips are a primary electronic component of ink jet print heads. Heater chips include memory which can store information within digital memory cells in the chip. This allows the print head to pass information stored on the heater chip to the print head host (the printing system to which it attaches) or the print controller 100 through the paths 104 controlled by the print controller 100.

For the most part, memory uses have included print head identifications ("ID's") and ink usage levels. Errors have meant the printer does not recognize the print head type or the printer has lost track of the ink amount used. Other uses include color correction and encryption keys. Errors arise from those uses potentially mean the printer has used the wrong color correction values or indicated a false security breach because of invalid encryption or decryption keys. These errors may be more visible to the customer than in the past.

In some heater chip designs, the heater chip passes the stored information or data to the controller 100 as a digital data stream such as a sequence of high and low voltages, binary logic states, or bits transferred in time. The data passes from the heater chip (transmitter) to the printer host (receiver) 100 via a single output channel named "ID." The printer host 100 clocks or synchronously sequences the data by providing a clocking control signal input channel named "LOAD" to the heater chip.

In some heater chip designs, it is not unusual to have data stream of a single binary logic state, that is, when the data is all high ("1") or all low ("0"). However, a data stream of a single binary state can also correspond to certain error conditions. Furthermore, if the heater chip has lost the connection to the LOAD signal, the ID signal will remain in an inactive or low voltage state, and the printer host 100 may falsely interpret the data as all 0's. If the printer host 100 has lost the connection to the ID signal, the ID signal may float to an active state and the printer host 100 may falsely interpret the data as all 1's. That is, when a valid data stream of all 0's are passed, for example, the ID output channel during data transmission remains at a voltage level matching the inactive state of the ID output. In yet another example, when the data consists of all 1's, the ID output channel during data transmission remains at a voltage level that corresponds to an ID output open circuit condition, In this way, the printer host or the print controller 100 may consider the print head 10 to be malfunctioning due to the data received.

As shown in FIG 2, accordingly, addition of a plurality of bits or a reference data stream into the ID data stream 200 can be used to detect whether an error is present in the data during communication. For example, to help the printer or the printer host 100 to detect a framing error, a serial reference data stream can be inserted into the responses or data streams from the print head 10. The additional reference data stream can be inserted into the data stream as any combination of start bits 204, sync bits 208, and stop bits 212 using a shift register, for example. Start bits 204 generally indicate a start of the data, sync bits 208 generally indicate a start or an end of a segment of the total data, and stop bits 212 generally indicate an end of the data. An absence of a start, sync or stop bit in a stream of data can indicate a "stuck at" condition which is a multiple bit link error.

In one embodiment, the reference data stream has a non-uniform bit pattern. For example, the reference data stream that uses a plurality of start bits will include at least two bits of different voltage values. In yet another example, the reference data stream is formed with a plurality of bits that are independent of the data stream. To ensure a framing error-free data communication, the print controller 100 is configured to know a priori the combination of reference data stream and original data stream bits it is to receive. Once a data stream is received, the data stream is searched for the known bit pattern, or the reference data stream. When the known bit pattern or the reference data stream is found, the received data stream is validated. In this way, data streams with a known reference data stream allow a printer or the print controller 100 to detect a framing error and recognize that the information received is incorrect.

To help the printer detect a link error, the print head 10 can insert in the response any single bit error detection code, any multiple bit error detection code, any adjacent bit error detection code or any uni-directional bit error detection codes in the response stream of data. Examples of single-bit error detection codes are parity check codes and residue codes. Examples of a multiple bit adjacent bit, and uni-directional bit error detection codes are "m" of "n" codes, duplication codes. cyclic codes such as cyclic redundancy checking ("CRC"), arithmetic codes including checksums, Berger codes, Hamming codes and horizontal or vertical parity codes. In addition, the printer can use the multiple bits, adjacent bit, and uni-directional bit error detection codes to correct errors.

Similar to the framing error detection, the use of start, sync, stop, and error correction codes in the serial data stream contained in print head memory and sent from the print head 10 to print controller 100 will prevent the printer from misinterpreting the stored data. The stored data can be ink usage, print head identification, encryption keys, color table corrections or any other future use of data stored in print head memory. Furthermore, as shown in FIG. 2, the data stream is inserted also with an error correction code 216. Although the start bits, the sync bits, the stop bits, and the error correction codes are shown with lengths of two to four bits, other data lengths such as a single bit can also be used. Although the data stream shown in FIG. 2 has been described as a data stream sent from the print head 10 to the print controller 100, the same error detection technique can also be applied to data sent from the print controller 100 to the print head 10. Furthermore, the reference data stream can generally include any combination of start, data, sync error correction/detection, and stop bits.

In another embodiment, the reference data stream includes at least two bits. For example, the start bits 204 include two bits, the sync bits 208 include three bits, or the stop bits 212 include two bits. Both the print head 10 and the print controller 100 are configured to insert the same reference data stream into data streams at the same position in the data stream being sent out, and to search for the same reference data stream at the same position in the data stream received. Furthermore, the reference data stream is configured to have a combination of high and low voltage values. For example, as shown in FIGS. 3 and 4, reference data stream patterns of "01" 220 and "10" 222 are inserted into data streams "11111111" 224, "01010100" 226, respectively, when transmitted from the heater chip of the print head to the print controller 100. In each of these instances, the reference data stream pattern is inserted after Bit 7 of the data stream.

In another example (shown in FIG. 5), a reference data stream 228 of bit pattern "10" has been inserted into a data stream "11111101" 230 before Bit 0. FIG. 6 shows that another reference data stream 232 of bit pattern "01" has been inserted between Bits 3 and 4 of a data stream "10110101" 234. FIG. 7 shows a fixed ending bit pattern of "010" 244 inserted in a data stream "11111111" 246. In this way, if the printer host 100 does not detect a combination of high and low added bits at the correct time during the sequence, the printer host 100 can determine that the communication link is in error, and can then take corrective or preventative action. Furthermore, the added bits provide other additional functions. For example, the added reference streams provide a check that the heater chip can drive the ID output to a low voltage state and a high voltage state. The added reference streams also provide a check that the data clocks or sequences out properly in time.

Various features and advantages of the invention are set forth in the following claims.

The invention claimed is:

1. A method of error detection in an inkjet printing apparatus having a printer host coupled to a print head, the method comprising the acts of:
communicating a first serial data stream between the printer host and the print head, wherein the act of communicating comprises the acts of providing a clocking control signal from the printer host;
utilizing the clocking control signal to synchronously sequence the first serial data stream;
inserting a reference data stream into the first serial data stream, wherein the reference data stream is combination of start, data, sync, error and stop bits formed with a non-uniform bit pattern; and
validating the first serial data stream based on the reference data stream.

2. The method of claim 1, further comprising the acts of:
transmitting a print head data stream comprising the first serial data stream and the reference data stream from the print head; and
receiving the print head data stream at the printer host.

3. The method of claim 1, wherein the act of inserting the reference data stream further comprises the act of adding to the first serial data stream at least one of a plurality of start bits, a plurality of sync bits, a plurality of stop bits, and at least one error detection bit.

4. The method of claim 3, wherein the error detection bit comprises at least one of a parity check code, residue code, "m" of "n" code, duplication code, cyclic code, arithmetic code, Berger code, Hamming code, horizontal parity code, or vertical parity code.

5. The method of claim 3, wherein the plurality of start bits have at least two bits of different voltage values.

6. The method of claim 1, further comprising the act of retrieving the first serial data stream stored in a print head memory.

7. A method of error detection in an inkjet printing apparatus having a printer host coupled to a print head, the method comprising the acts of:
receiving a serial command at the print head from the printer host, the serial command comprising a request for a data stream and a request for a reference data stream at a reference location within the data stream, wherein the reference data stream comprises a bit width of at least two adjacent bits;
retrieving the data stream from a print head memory;
adding the reference data stream into the data stream at the reference location, thereby forming a first serial data stream,
receiving the first serial data stream at the printer host from the print head wherein the act of receiving comprises the acts of providing a clocking control signal from the printer host and utilizing the clocking control signal to synchronously sequence the first serial data stream;
searching for the reference data stream at the reference location within the received first serial data stream, wherein the reference data stream is combination of start, data, sync, error and stop bits formed with a non-uniform bit pattern;
validating the received first serial data stream when the received first serial data stream comprises the reference data stream at the reference location;

recognizing an incorrect received first serial data stream; and detecting a framing error or a link error from the incorrect received first serial data stream.

8. The method of claim 7, wherein the act of inserting the reference data stream comprises the act of adding to the first serial data stream at least one of a plurality of start bits, a plurality of sync bits, a plurality of stop bits, and at least one error detection bit.

9. The method of claim 8, wherein the at least one error detection bit comprises a parity check code, residue code, "m" of "n" code, duplication code, cyclic code, arithmetic code, Berger code, Hamming code, horizontal parity code, or vertical parity code.

10. A data error detection system on an inkjet print head coupled to a host, the data error detection system comprising:
   a clocking control signal generated by the host;
   a print head communication link coupling the print head and the host, and configured to communicate a first serial data stream between the print head and the host, wherein the first serial data stream is synchronously sequenced at a frequency of the clocking control signal;
   a data stream processor coupled to the print head, and configured to insert a reference data stream into the first serial data stream at a reference location wherein the reference data stream is combination of start, data, sync, error and stop bits formed with a non-uniform bit pattern; and
   a data validating module coupled to the host, and configured to validate the first serial data stream based on the reference data stream, recognize an incorrect first serial data stream, and detect a framing error or a link error from the incorrect first serial data stream.

11. The data error detection system of claim 10, wherein the data stream processor adds at least one of a plurality of start bits, a plurality of sync bits, a plurality of stop bits, and at least one error detection bit to the first serial data stream.

12. The data error detection system of claim 11, wherein the at least one error detection bit comprises a parity check code, residue code, "m" of "n" code, duplication code, cyclic code, arithmetic code, Berger code, Hamming code, horizontal parity code, or vertical parity code.

13. The data error detection system of claim 10, wherein the inkjet print head retrieves the first serial data stream from a print head memory.

14. An inkjet printing apparatus comprising:
   a print head configured to insert a reference data stream into a first serial data stream at a reference location, and synchronously sequence and transmit the first serial data stream according to a clocking control signal wherein the reference data stream is combination of start, data sync, error and stop bits formed with a non-uniform bit pattern; and
   a print controller adapted to be coupled to the print head, and configured to receive the first serial data stream from the print head, search for a validating data stream from the transmitted first serial data stream to validate the received first serial data stream when the validating data stream comprises a valid data stream pattern, and to act on the valid or invalid first serial data stream to recognize an incorrect received first serial data stream, and to detect a training error or a link error from the incorrect received first serial data stream.

15. The inkjet printing apparatus of claim 14, wherein the print head retrieves the first serial data stream from a print head memory.

16. The inkjet printing apparatus of claim 14, wherein the print head inserts a reference data stream into the first serial data stream.

17. The inkjet printing apparatus of claim 16, wherein the print head adds to the first serial data stream at least one of a plurality of start bits, a plurality of sync bits, a plurality of stop bits, and at least one error detection bit.

18. the inkjet printing apparatus of claim 17, wherein the at least one error detection bit comprises a parity check code, residue code, "m" of "n" code, duplication code, cyclic code, arithmetic code, Berger code, Hamming code, horizontal parity code, or vertical parity code.

19. The inkjet printing apparatus of claim 16, wherein the reference data stream has a reference pattern, and wherein the print controller compares the reference pattern with the valid data pattern.

20. A print head adapted to be used in a printing apparatus, to be coupled to a host, and to store a first data stream in memory, the print head comprising a data stream processor adapted to retrieve the first data stream from the memory, to insert a reference data stream comprising a reference pattern into the first data stream at a reference location thereby forming a transmit data stream, and to synchronously sequence and serially transmit the transmit data stream to the host at a control signal clock frequency, so that the host, upon receiving a data stream, can validate the received data stream if the received data stream comprises
   the transmit data stream with the inserted reference data stream at the reference location, wherein the reference data stream is combination of start, data, sync, error and stop bits formed with a non-uniform bit pattern.

21. The print head of claim 20, comprises a data stream processor adapted to insert the reference data stream.

22. The print head of claim 20, and wherein the reference data stream comprises at least one of a plurality of start bits a plurality of sync bits, a plurality of stop bits, and at least one error detection bit.

23. The print head of claim 22, and wherein the at least one error detection bit comprises a parity check code, residue code, "m" of "n" code, duplication code. cyclic code, arithmetic code, Berger code, Hamming code, horizontal parity code, for vertical parity code.

* * * * *